United States Patent
Nyfelt

[19]

[11] Patent Number: 5,798,714
[45] Date of Patent: Aug. 25, 1998

[54] ARRANGEMENT FOR PREVENTING A MOTOR VEHICLE FROM PASSING A SPECIFIC PLACE UNAUTHORIZED

[75] Inventor: Leif Nyfelt, Skövde, Sweden

[73] Assignee: Scarinus Development AB, Skovde, Sweden

[21] Appl. No.: 702,465

[22] PCT Filed: Mar. 22, 1995

[86] PCT No.: PCT/SE95/00297

§ 371 Date: Sep. 24, 1996

§ 102(e) Date: Sep. 24, 1996

[87] PCT Pub. No.: WO95/25650

PCT Pub. Date: Sep. 28, 1995

[30]   Foreign Application Priority Data

Mar. 24, 1994 [SE] Sweden ............... 9400998

[51] Int. Cl.$^6$ ................................................. G08G 1/123
[52] U.S. Cl. ................. 340/988; 340/539; 340/928; 701/300
[58] Field of Search ............................ 340/573, 550, 340/988, 905, 991, 928, 539, 989, 993; 342/457; 701/300

[56]   References Cited

U.S. PATENT DOCUMENTS

| | | | |
|---|---|---|---|
| 4,849,735 | 7/1989 | Kirtley et al. ................. | 340/901 |
| 5,345,902 | 9/1994 | Kalail, Sr. et al. .............. | 340/426 |
| 5,347,274 | 9/1994 | Hassett ........................... | 340/988 |
| 5,422,473 | 6/1995 | Kamata ........................... | 340/928 |
| 5,497,149 | 3/1996 | Fast ................................. | 340/988 |

FOREIGN PATENT DOCUMENTS

| | | |
|---|---|---|
| 2 119 552 | 11/1983 | United Kingdom. |
| 2 218 243 | 11/1989 | United Kingdom. |
| WO 93/17895 | 9/1993 | WIPO. |

*Primary Examiner*—Brent A. Swarthout
*Attorney, Agent, or Firm*—Young & Thompson

[57] ABSTRACT

The present invention relates to an arrangement for preventing the unauthorized passage of a motor vehicle (1) past a specific location. According to the invention the arrangement includes a transmitter (4) which delivers a specific radio signal of limited range is mounted at said specific location. The vehicle (1) has installed therein a receiver (3) which responds to the specific radio signal and which upon receipt of said specific signal activates a vehicle-mounted check means (5) which checks whether or not the vehicle is authorized to pass said specific location and which is constructed to activate one or more electronic circuits in the vehicle in a manner to render said vehicle inoperable when said vehicle is not authorized to pass said specific location.

7 Claims, 1 Drawing Sheet

5,798,714

1

ARRANGEMENT FOR PREVENTING A MOTOR VEHICLE FROM PASSING A SPECIFIC PLACE UNAUTHORIZED

FIELD OF THE INVENTION

The present invention relates to an arrangement for preventing a motor vehicle from passing beyond a specific place unauthorized.

BACKGROUND OF THE INVENTION

A problem which is becoming ever more serious in present day communities resides in the theft of vehicles and their exportation to foreign countries.

SUMMARY OF THE INVENTION

The prime object of the present invention is to alleviate this problem by making it difficult for a stolen vehicle to pass through customs unnoticed.

This object is achieved with an arrangement which functions to prevent a motor vehicle from passing beyond a specific location unauthorized and which is characterized in that the specific location has placed therein a transmitter which transmits a specific radio signal of limited range; in that the vehicle includes a receiver which is responsive to the specific radio signal and which upon receipt of the specific signal activates a check means provided in the vehicle, the means checking whether the vehicle is authorized to pass the specific location and which is constructed to activate one or more electronic circuits in the vehicle in a manner which will render the vehicle inoperable, in the event that the vehicle is not authorized to pass beyond the specific location. This will then draw the attention of the customs personnel to the fact that the vehicle is not authorized to leave the country, for one reason or another.

According to one preferred embodiment of the invention, the transmitter mounted in the specific location is a transponder which delivers a modulated reflected signal in response to a signal transmitted by a vehicle mounted transmitter when the transponder is located within the range of the vehicle transmitter.

The check device is preferably constructed to activate a vehicle alarm circuit when the vehicle is unauthorized to pass beyond the specific location.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
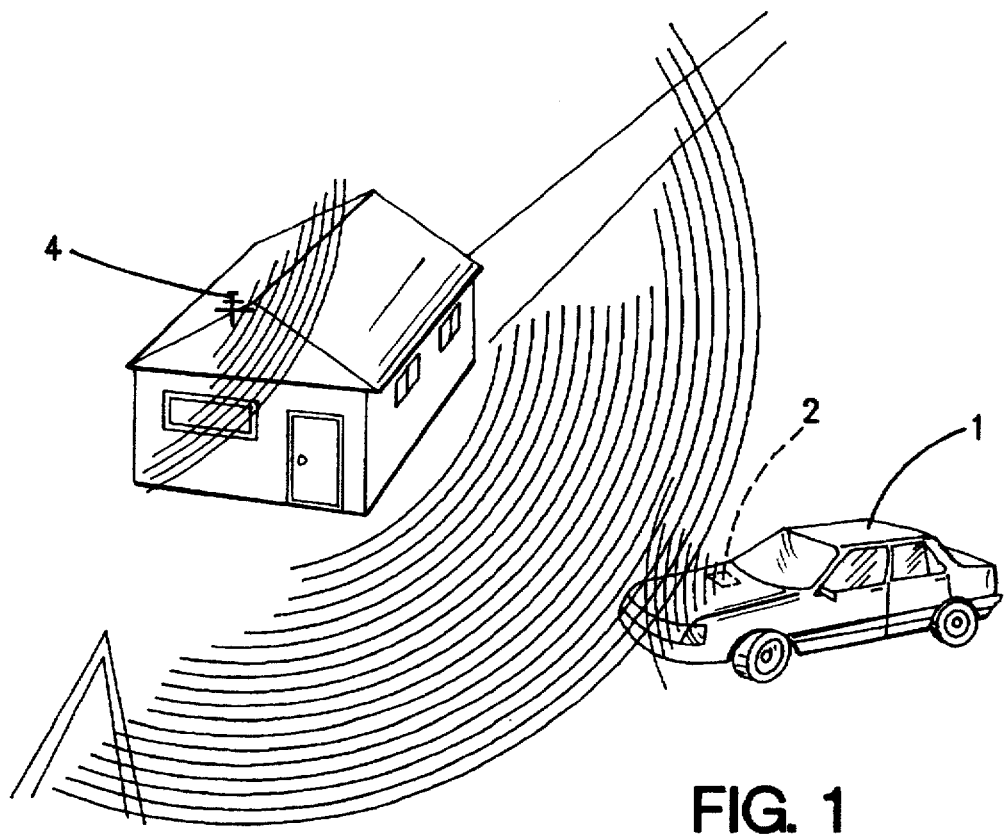
FIG. 1 illustrates schematically a customs station equipped with one embodiment of an inventive arrangement.
Figure 2:
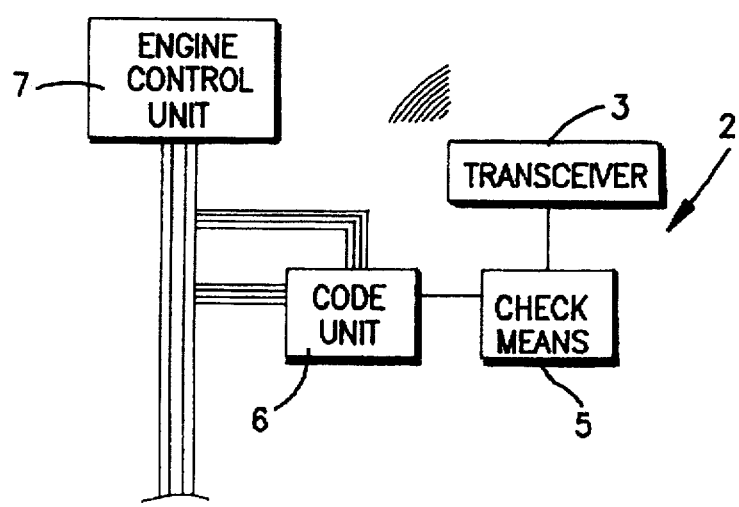
FIG. 2 is a schematic functional diagram of the arrangement shown in FIG. 1.

FIG. 1 illustrates a motor vehicle 1 on its way through a customs station. The vehicle 1 is equipped with a device 2 in accordance with the invention. This device includes a transceiver 3 which when the vehicle ignition is switched-on continuously transmits a radio signal of limited range, preferably a range of 10–50 m. Mounted in the custom station is a transponder 4 which is receptive to the signal transmitted by the unit 3 in the vicinity of the border crossing. The transponder 4 is adapted to reflect a modulated

2 signal in a known manner, in response to the signal from the device 2. When the unit 3 receives the response signal, the unit sends a signal to a check means 5 included in the device 2, the means checking whether the vehicle is authorized to leave the country. IF this check indicates that the vehicle is not authorized to leave the country, the check means delivers a signal which, via a device 6 activates one or more electronic circuits in the vehicle such as to render unserviceable one or more of the vehicle functions. For instance, the device 6 may be constructed to break the current supply to the vehicle ignition system.

According to one preferred embodiment of the invention, the device 6 consists in a code unit having an electronic lock of the type described in SE-B-469 704 and marketed by Scarinus AB under designation SC 202. A plurality of conductors pass through the code unit 6 from an engine control unit 7, which controls engine functions, and the code unit makes it impossible to bypass the electronic lock. Reference is made to the aforesaid patent specification for closer details of the construction of the code unit. The code unit 6 includes a microprocessor which upon receipt of a signal from the check means commands the code unit to break the current supply to the ignition system for instance. The arrangement 2 is also constructed to send a signal to the code unit continuously while the vehicle is running, so as to make it impossible to avoid the effect of a stop signal from the check means by simply dismantling the arrangement 2.

Thus, it must be possible to switch the check means 5 between a first position or state in which a signal is delivered to the code unit 6 upon receipt of a response signal from the transponder 4, therewith rendering the vehicle unserviceable, and a second position or state in which no signal is sent to the code unit upon receipt of the response signal, therewith enabling driving of the vehicle to be continued. In its simplest form, the check means may include a relay or a switch which in a respective first state or position establishes a conductive connection between the receiver 3 and the code unit 6, and which in a respective second state or position breaks this connection, and an externally maneuverable relay or switch control means. This control means may, for instance, have the form of a rotational pin or rumbler in a key operated cylinder lock, which when turned by the key mechanically adjusts the switch, or an electronic unit which includes a button bank, or some other device by means of which a code can be delivered to the unit, and a device for comparing the input code with a prestored code and for delivering a re-setting signal to the relay when agreement exists.

When a vehicle 1 equipped with the arrangement 2 approaches a customs station that is equipped with a transponder 4, the transponder will be activated by the vehicle when said vehicle is located at a limited distance from the transponder and therewith delivers a response signal to the arrangement 2. If the vehicle has no authorization to pass the customs border, i.e. if the check means has not been switched to its second state or position, the vehicle engine will be stopped through the medium of the code unit 6, a circumstance which should cause the customs personnel to check the vehicle. In order for the vehicle to be started and driven, it is necessary to roll the vehicle out of the customs station and beyond the range of the transponder 4. In this regard it should be mentioned that the range of the transponder signal should not be greater than the area covered by the customs station so that the vehicle will not be influenced by the signal outside this area. According to one variant of the invention, the code unit 6 may also be constructed to activate an alarm circuit when it receives an unauthorized vehicle indicating signal from the check means 5, which should further draw the attention of the customs personnel to the effect that the vehicle should be checked.

Naturally, the described arrangement can be used in contexts other than the passage of a vehicle across a manned border point. For instance, the invention can be applied in the context of vehicle parking or vehicle accommodation areas which are closed during certain periods of the day, by installing in these areas a transponder which is activated during these closed periods, thereby preventing the vehicle from being driven away from the parking area unauthorized.

It will be understood that the described and illustrated embodiment of the invention can be modified in several ways within the scope of the invention, particularly with regard to the construction of the check means. For instance, one or more conductors in electronic circuits may be passed through the check means, and the check means may be adapted to break the current supply to these circuits directly when an unauthorized vehicle attempts to pass a specific location. The transmitter installed at this specific location may be constructed to deliver a signal continuously to a vehicle mounted receiver, which in this case requires no transmitter. The invention is therefore solely limited by the contents of the following claims.

I claim:

1. A system for preventing unauthorized passage of a motor vehicle past a specific location, said system comprising:
    a stationary transmitter mounted at the specific location for transmitting a first radio signal;
    a receiver mounted in the vehicle for receiving the first radio signal;
    check means mounted in the vehicle for checking whether the vehicle is authorized to pass the specific location and for activating at least one circuit in the vehicle to render the vehicle undrivable selectively, said receiver activating said check means upon receipt of the first radio signal, the system further comprising a vehicle-mounted transmitter for transmitting a second radio signal, wherein said stationary transmitter is a transponder that transmits the first radio signal in response to the second radio signal when said vehicle-mounted transmitter is in a range of the transponder, the first radio signal being a modulated reflected signal relative to the second radio signal.

2. The system according to claim 1, further comprising a vehicle-mounted alarm circuit, said check means activating said alarm circuit when the vehicle is not authorized to pass the specific location.

3. The system according to claim 1, further comprising a vehicle-mounted alarm circuit, said check means activating said alarm circuit when the vehicle is not authorized to pass the specific location.

4. A system for preventing unauthorized passage of a motor vehicle past a location, said system comprising:
    a stationary transponder at the location;
    a transceiver mounted in the vehicle for transmitting a radio signal;
    said transponder for automatically transmitting to said transceiver a response signal to the radio signal;
    an engine control unit mounted in the vehicle;
    check means mounted in the vehicle for checking whether the vehicle is authorized to pass the location, said check means for sending a stop signal to said engine control unit to render the vehicle undrivable, when said transceiver receives the response signal and the vehicle is unauthorized to pass the location; and
    a user-manipulable code unit mounted in the vehicle for selectively overriding the stop signal, thereby rendering the vehicle drivable.

5. A method of preventing unauthorized passage of a motor vehicle past a specific location, the method comprising the steps of:
    transmitting a radio signal from a transceiver mounted in the vehicle;
    automatically transmitting a response signal from a transponder at the specific location in response to the radio signal;
    checking whether the vehicle is authorized to pass the location using a check means mounted in the vehicle;
    sending a stop signal from said check means to an engine control means in the vehicle for rendering the vehicle undrivable, when the transceiver receives the response signal and the vehicle is unauthorized to pass the location; and
    selectively overriding the stop signal using a user-manipulable code unit to render the vehicle drivable.

6. A system for preventing unauthorized passage of a motor vehicle past a specific location, said system comprising:
    a stationary transmitter mounted at the specific location for transmitting a first radio signal;
    a receiver mounted in the vehicle for receiving the first radio signal;
    check means mounted in the vehicle for checking whether the vehicle is authorized to pass the specific location and for activating at least one circuit in the vehicle to render the vehicle undrivable selectively, said receiver activating said check means upon receipt of the first radio signal, wherein said check means has a first state and a second state, so that when said check means is in the first state, the first radio signal is forwarded to and activates a control unit which controls said at least one circuit in the vehicle, and when said check means is in the second state, the first radio signal is not so forwarded.

7. A system for preventing unauthorized passage of a motor vehicle past a specific location, said system comprising:
    a stationary transmitter mounted at the specific location for transmitting a first radio signal;
    a receiver mounted in the vehicle for receiving the first radio signal;
    check means mounted in the vehicle for checking whether the vehicle is authorized to pass the specific location and for activating at least one circuit in the vehicle to render the vehicle undrivable selectively, said receiver activating said check means upon receipt of the first radio signal, the system further comprising a code unit mounted in the vehicle for preventing bypass of the check means.

* * * * *